(No Model.)
D. W. COPELAND.
JOURNAL BEARING.
No. 496,347. Patented Apr. 25, 1893.
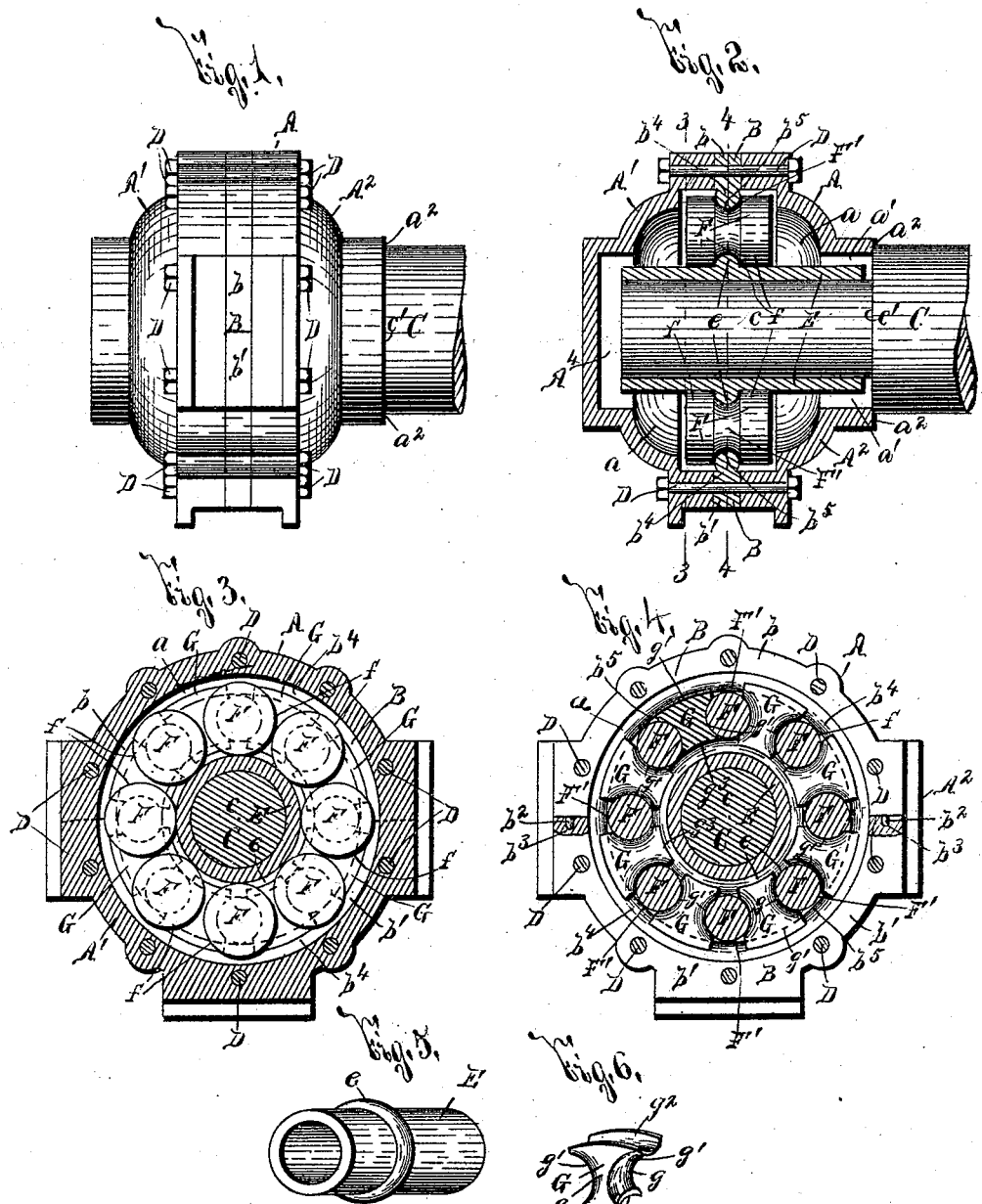
WITNESSES:
INVENTOR
David W. Copeland
BY
ATTORNEYS.

UNITED STATES PATENT OFFICE.

DAVID W. COPELAND, OF SYRACUSE, NEW YORK.

JOURNAL-BEARING.

SPECIFICATION forming part of Letters Patent No. 496,347, dated April 25, 1893.

Application filed September 26, 1892. Serial No. 446,867. (No model.)

*To all whom it may concern:*

Be it known that I, DAVID W. COPELAND, of Syracuse, in the county of Onondaga, in the State of New York, have invented new and useful Improvements in Journal-Bearings, of which the following, taken in connection with the accompanying drawings, is a full, clear, and exact description.

My invention relates to improvements in journal bearings or boxes of the particular class set forth in my pending applications, Serial Nos. 436,416 and 440,877, filed, respectively, June 13 and July 22, 1892; and has for its object the production of a practical, simple, efficient and durable device capable of self-adjustment for preventing the usual binding of the axle or shaft when one of its ends is caused to assume an abnormal position; and to this end it consists, essentially, in an outer casing provided with a bearing rib projecting from its inner face, a sleeve within the casing, encircling a portion of the axle or shaft, and formed with a bearing rib aligned with the bearing rib of the casing, and anti-friction rollers having their bearing faces of greater width than the bearing face of the rib on the inner face of the casing, said roller bearing faces being normally separated from the inner face of the casing and being each provided with a groove for receiving said bearing ribs, whereby the rollers have an independent adjustable movement on the former rib and are supported at their central portions by the latter rib.

The invention furthermore consists in the detail construction and arrangement of the parts, all as hereinafter more particularly described and pointed out in the claims.

In describing this invention, reference is had to the accompanying drawings, forming a part of this specification, in which, like letters indicate corresponding parts in all the views.

Figure 1 is a side elevation of my improved journal bearing and the detached end of an axle mounted therein. Fig. 2 is a longitudinal vertical sectional view of the parts as shown at Fig. 1, the axle being illustrated in elevation. Figs. 3 and 4 are transverse vertical sectional views, taken, respectively, on lines 3—3, and 4—4, Fig. 2; and Figs. 5 and 6 are isometric perspectives of the detached sleeve for encircling the axle and one of the detached separators for preventing contact of the separating rollers.

The bearing or box —A— is here shown as formed with a central chamber —a— and as composed of outer sections —A'—A²— and a central section —B—. The outer section —A²— is formed with an opening —a'— in its wall for permitting the insertion of the end —c— of the axle —C— into the chamber —a—. This opening —a'— is of greater diameter than the end or journal —c— of the axle —C— for permitting said portion of the axle to move adjustably within the chamber —a—. To further facilitate this movement of the axle end —c—, the casing section —A'— is formed with a chamber or socket —A⁴— which receives the extremity of the journal —c— and is formed of greater diameter than said journal. The axle or shaft —C— is formed with an annular shoulder —c'— which bears against a flange or shoulder —a²— on the adjacent face of the section —A²—.

The central section —B— consists of two divisions —b—b'— having their adjacent ends secured together by dowel pins —b²— on the ends of one of the sections adapted to enter sockets —b³— in the ends of the other section. On the inner face of the sections —b—b'— is a rib —b⁴— concavely curved transversely and having its outer face —b⁵— adapted to form a bearing for anti-friction rollers, which, as previously described, are arranged within the casing —A—. Suitable clamps, as bolts —D—, are passed through the outer and inner sections of the casing —A— and serve to firmly secure together said separated sections and cause the same to form a complete and solid whole.

—E— is a sleeve encircling a portion of the end or journal —c— of the axle —C—. As preferably constructed, this sleeve closely fits the axle end —c— and is free to slide thereon for permitting its easy removal and replacement.

—e— is an annular rib having its outer face concavely curved transversely and aligned with the face —b⁵— of the rib —b⁴— on the inner face of the casing —A—.

—F— represents anti-friction rollers arranged in a series between the sleeve —E— and the inner face of the casing —A—. The bearing face —f— of each of these rollers is considerably wider than the bearing face —$b^5$— of the rib —$b^4$— and is adapted to bear against the outer face of the sleeve —E—.

The rollers —F— are each provided with grooves —F'— arranged midway between their extremities and formed of rounding cross sections for receiving the ribs —$b^4$—e—. As clearly seen at Figs. 2 and 3, the depth of the grooves —F'— and the thickness of the rib —$b^4$— on the inner face of the casing —A— are so proportioned that the extremities of the faces —f— of the rollers —F— do not bear against the inner face of the casing —A—, but are separated therefrom. Consequently, the rollers are free to move independently upon the rib —$b^4$— as the plane of the axle end —c— is varied.

In practice, I have discovered that as the ends of the roller faces —f— are supported upon the sleeve —E— at one side of the rollers and their central contracted portions upon an intervening rib at the opposite side of the rollers, there is more or less liability of the rollers becoming bent, especially when considerable weight is supported by the axle journaled in the casing provided with said rollers. This liability of bending is entirely prevented, however, by providing the sleeve —E— with a rib —e— aligned with the rib —$b^4$— for supporting the contracted portions of said rollers on their inner faces. As is evident, this rib does not prevent, in the slightest, the independent adjustable movement of the rollers —F— upon the rib —$b^4$— as the sleeve and rollers move simultaneously whenever the rollers move adjustably, since it is the movement from its normal plane of the axle carrying the sleeve, which varies the normal position of the rollers —F—. The sleeve —E— therefore forms an essential feature of my present invention and serves to additionally support the central contracted portions of the rollers. The sleeve —E— may be of material somewhat softer than the axle and the rollers, and can then be easily replaced with a new one when sufficiently worn to render its removal desirable. Moreover, by the use within the roller bearing of a sleeve free to slide on the axle should it be necessary, the practicability of my invention is greatly enhanced since the axle, which sometimes has a slight lengthwise movement on the box, can slide freely within the sleeve without impairing, in the slightest, the capability of the anti-friction rollers to adjust themselves to the plane of the axle.

The axle end may, if desired, be provided with a rib, similar to the rib —e— upon the sleeve —E— and the use of the sleeve rendered unnecessary. It is, however, extremely impracticable and expensive to provide an axle or shaft with such a rib.

—G—, Figs. 2, 3, 4 and 6 are separating blocks for preventing the contact of contiguous faces of the rollers —F—. These blocks are preferably formed with contracted central portions —g—, the opposite sides —g'— $g'$— for engaging the faces of the grooves —F'— in the rollers —F—, and the opposite faces —$g^2$—$g^3$— for engaging, respectively, the ribs —$b^4$—e—. As is clearly seen in the drawings, the sides —$g'$—$g'$— are concavely curved lengthwise, and convexly curved transversely and the sides —$g^2$—$g^3$— are convexly curved lengthwise, and concavely curved transversely. Separating blocks of this peculiar construction are supported in position upon four sides, and, owing to the curved faces of said sides, which closely fit the adjacent surfaces of the casing, the anti-friction rollers and the sleeve, all rattling of the parts is entirely obviated and the contiguous faces of the rollers are firmly and positively prevented from rolling against each other. Moreover, the blocks —G— are economically manufactured, readily placed in position, and quickly removed when worn.

The operation of my invention will be readily perceived from the foregoing description and upon reference to the accompanying drawings, and it will be particularly noted that its parts are simple in construction, readily assembled and replaced, and that the entire device forms a highly efficient and durable journal box which automatically adjusts itself to an abnormal position of the axle without cramping the anti-friction rollers and unduly wearing the journal bearing. It will be evident, however, that the detail construction and arrangement of the parts of my invention may be somewhat changed from that shown and described without departing from the spirit of my invention.

Having thus fully described my invention, what I claim as new, and desire to secure by Letters Patent, is—

1. The herein described roller bearing, the same comprising an outer casing provided with an annular bearing rib on its inner face, a sleeve within the casing formed with a projecting rib on its outer face, and anti-friction rollers interposed between said bearing ribs of the casing and sleeve, and formed with bearing faces of greater width than the bearing face of said rib on the inner face of the casing, said rollers having their bearing faces normally separated from the inner face of the casing and each provided with a groove for receiving said bearing ribs of the casing and sleeve whereby the rollers have an adjustable movement on the former rib and are supported at their central portions by the latter rib, substantially as and for the purpose set forth.

2. The herein described roller bearing, the same comprising an outer case provided with an annular bearing rib on its inner face, a sleeve within the casing formed with a projecting rib on its outer face, anti-friction rollers interposed between said bearing ribs of the casing and sleeve, and formed with bearing faces of greater width than the bearing face of said rib on the inner face of the casing, said rollers having their bearing faces normally separated from the inner face of the casing and each provided with a groove for receiving said bearing ribs of the casing and sleeve, whereby the rollers have an adjustable movement on the former rib and are supported at their central portions by the latter rib, and a separating block interposed between each two of said rollers, substantially as and for the purpose specified.

3. The herein described roller bearing, the same comprising an outer casing provided with an annular bearing rib on its inner face, a sleeve within the casing formed with a projecting rib on its outer face, anti-friction rollers interposed between said bearing ribs of the casing and sleeve and formed with bearing faces of greater width than the bearing face of said rib on the inner face of the casing, said rollers having their bearing faces normally separated from the inner face of the casing and each provided with a groove for receiving said bearing ribs of the casing and sleeve whereby the rollers have an adjustable movement on the former rib and are supported at their central portions by the latter rib, and a separating block interposed between each two of said rollers and formed with opposite sides concavely curved longitudinally for receiving the adjacent faces of said rollers, and formed also with opposite sides convexly curved transversely for receiving said ribs on the casing and journal, substantially as and for the purpose set forth.

4. The herein described roller bearing, the same comprising an outer casing, provided with an annular bearing rib on its inner face a shaft or axle having a portion thereof within the casing, a sleeve arranged upon a part of said portion of the axle and provided with a rib on its outer face aligned with the rib on the casing, anti-friction rollers interposed between said bearing ribs of the casing and sleeve and formed with bearing faces of greater width than the bearing face of said rib on the inner face of the casing, said rollers having their bearing faces normally separated from the inner face of the casing and each provided with a groove for receiving the bearing ribs of the casing and sleeve, whereby the rollers have an adjustable movement on the former rib, and are supported at their central portions by the latter rib, and a separating block supported within the grooves of two adjacent rollers, substantially as and for the purpose set forth.

5. The combination with an outer casing, and anti-friction bearing rollers movable within the casing and formed with grooves of rounding cross section; of the herein described separating block for separating the adjacent faces of two of the rollers, said block being registered with the grooves between adjacent rollers and being formed with opposite faces bearing against the adjacent faces of the grooves, said block faces being concavely curved in the plane thereof extending lengthwise of said grooves and being convexly curved in the opposite plane extending transversely of said grooves, substantially as and for the purpose set forth.

In testimony whereof I have hereunto signed my name, in the presence of two attesting witnesses, at Syracuse, in the county of Onondaga, in the State of New York, this 24th day of September, 1892.

DAVID W. COPELAND.

Witnesses:
CLARK H. NORTON,
M. BAXTER.